United States Patent [19]

Nakanishi et al.

[11] 4,162,661
[45] Jul. 31, 1979

[54] INTERNAL COMBUSTION ENGINE WITH COMBUSTION CHAMBERS WHICH CREATE A SQUISH AND SWIRL OF AN AIR-FUEL MIXTURE

[75] Inventors: Kiyoshi Nakanishi; Takeshi Okumura, both of Susono, Japan

[73] Assignee: Toyota Jidosha Kogyo Kabushiki Kaisha, Aichi, Japan

[21] Appl. No.: 826,560

[22] Filed: Aug. 22, 1977

[30] Foreign Application Priority Data

Feb. 25, 1977 [JP] Japan .................................. 52-021433

[51] Int. Cl.² ............................................. F02F 3/28
[52] U.S. Cl. ............................. 123/30 C; 123/193 P
[58] Field of Search ............ 123/30 C, 191 M, 193 R, 123/193 CP, 193 P

[56] References Cited

U.S. PATENT DOCUMENTS

| 1,856,328 | 5/1932 | French | 123/30 C |
|---|---|---|---|
| 2,031,395 | 2/1936 | Vincent | 123/30 C |
| 2,600,440 | 6/1952 | Smith | 123/193 P |
| 3,357,318 | 12/1967 | Packard et al. | 123/193 P |
| 3,641,986 | 2/1972 | Fricker et al. | 123/30 C |
| 4,041,923 | 8/1977 | Konishi et al. | 123/30 C |

*Primary Examiner*—Charles J. Myhre
*Assistant Examiner*—Craig R. Feinberg
*Attorney, Agent, or Firm*—Stevens, Davis, Miller & Mosher

[57] ABSTRACT

An internal combustion engine with combustion chambers which create a squish and swirl of an air-fuel mixture is disclosed. In the disclosed engine an inner wall of a cylinder head and a top end of a piston are provided with at least two projected regions defining gaps for creating the squish and swirl of the air-fuel mixture toward the end of the compression stroke of the piston.

6 Claims, 7 Drawing Figures

INTERNAL COMBUSTION ENGINE WITH COMBUSTION CHAMBERS WHICH CREATE A SQUISH AND SWIRL OF AN AIR-FUEL MIXTURE

FIELD OF THE INVENTION

The present invention relates generally to an internal combustion engine, and more particularly relates to a reciprocal piston type internal combustion engine with combustion chambers having a shape which creates a squish and swirl of an air-fuel mixture during the time the pistons of the internal combustion engine are performing a compression stroke. The squish and swirl of an air-fuel mixture causes a further mixing of the air-fuel mixture prior to commencement of combustion of the mixture. As a result of the further mixing, not only engine output of an internal combustion engine is increased, but also emission of unburned hydrocarbons from the engine is reduced.

BACKGROUND OF THE INVENTION

Generally, the cylinders of an internal combustion engine are provided with a certain cooling means or cooling circuit to cool peripheral walls of the cylinders. This is because by cooling the peripheral walls of the cylinders, it is possible for the pistons of the internal combustion engine to smoothly reciprocate in the cylinders so as to slide along the surface of the liner of the cylinders. However, cooling of the peripheral walls of the cylinders often results in the occurrence of such an inconvenience that a part of the air-fuel mixture adjacent to the inner surface of the cylinders is quite susceptible to cooling via the peripheral walls of the cylinders, even after ignition of the air-fuel mixture. Therefore, even after the completion of the combustion of the air-fuel mixture, some amount of unburned or incompletely burned gas is left in the cylinders. Consequently, at some moment in the subsequent exhaust stroke of the pistons, the unburned or incompletely burned gas is discharged out of the cylinders together with the completely burned emission gas from the internal combustion engine.

In order to prevent any amount of an air-fuel mixture from being left unburned or incompletely burned, there has already been proposed a method of employing particularly shaped combustion chambers wherein a squish of a part of an air-fuel mixture fed into the cylinders is created during the compression stroke of the pistons of an internal combustion engine. The squish of the air-fuel mixture is forced to stream along the inner walls of the combustion chambers of an internal combustion engine. Thus, the stream of the squish of the air-fuel mixture forcedly causes all of the air-fuel mixture, which stagnates in a region of each combustion chamber adjacent to the peripheral wall, to move away from that region toward the center of the combustion chamber. The stream of the squished air-fuel mixture also assists in the creation of a swirl of the air-fuel mixture within the combustion chambers at the end stage of the compression stroke of the pistons. As a result, further mixing of the air-fuel mixture is promoted, so that a very homogenized air-fuel mixture is produced prior to the commencement of the combustion stroke of the pistons. Therefore, when the homogenized air-fuel mixture is ignited, quick flame propagation occurs in the cylinders. As a result, the speed of the combustion of the air-fuel mixture is greatly increased compared with an internal combustion engine having no squish and swirl creative combustion chambers.

An object of the present invention is to provide an internal combustion engine provided with squish and swirl creative combustion chambers having a novel shape compared with that of combustion chambers which have already been proposed, so that performance of an internal combustion engine is appreciably enhanced due to the simultaneous accomplishment of the cleaning of emissions from the engine and of an increase of the axial torque delivered from the engine.

Another object of the present invention is to provide combustion chambers of an internal combustion engine of which the shape is in a specified dimensional range determined by experiments which were conducted by the present inventor for the purpose of reducing the emission of unburned hydrocarbon components from an internal combustion engine and of increasing the engine output power.

The present invention will become more apparent from the ensuring description of a preferred embodiment, with reference to the accompanying drawings wherein.

DESCRIPTION OF THE PREFERRED EMBODIMENT

Figure 1:
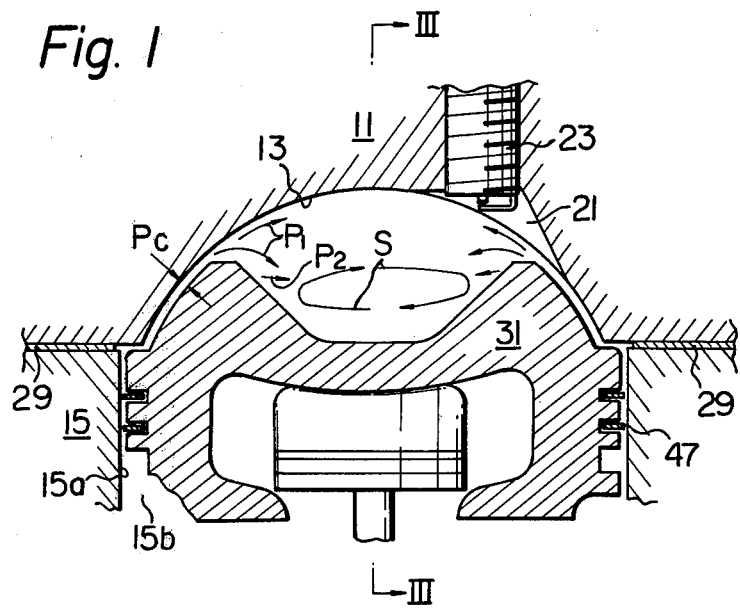
FIG. 1 is a cross-sectional view of an embodiment of a combustion chamber of an internal combustion engine, according to the present invention.
Figure 2:
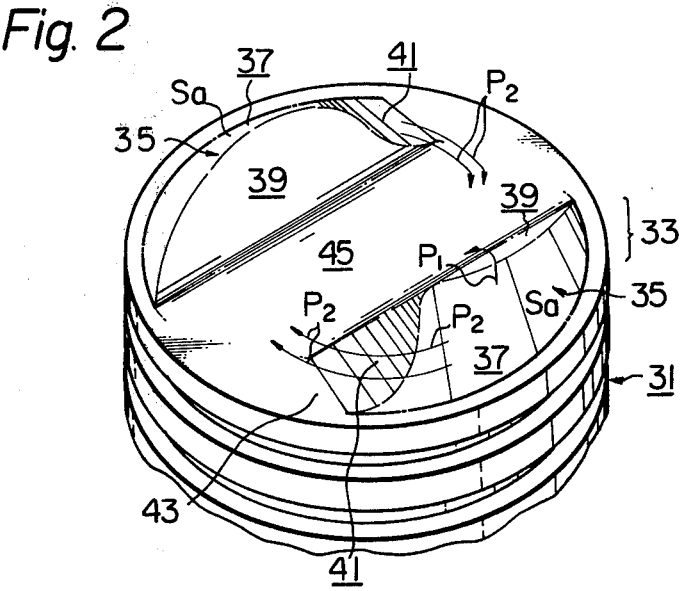
FIG. 2 is a perspective view of a top end of a piston employed for forming the combustion chamber of FIG. 1.
Figure 3:
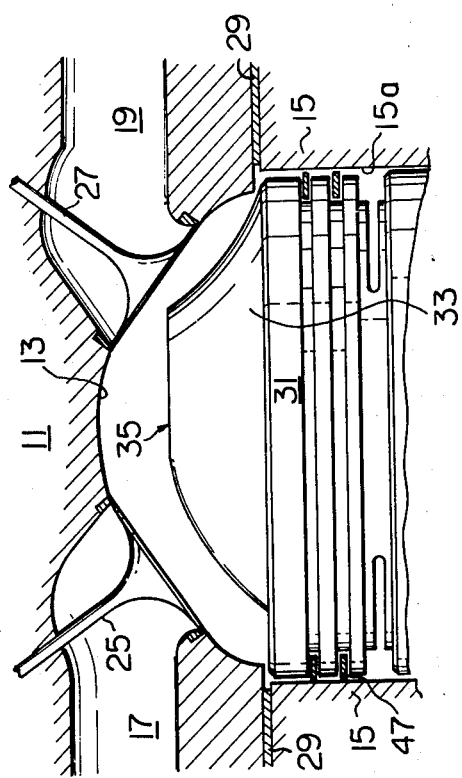
FIG. 3 is a cross-sectional view taken along the line III—III of FIG. 1.
Figure 4:
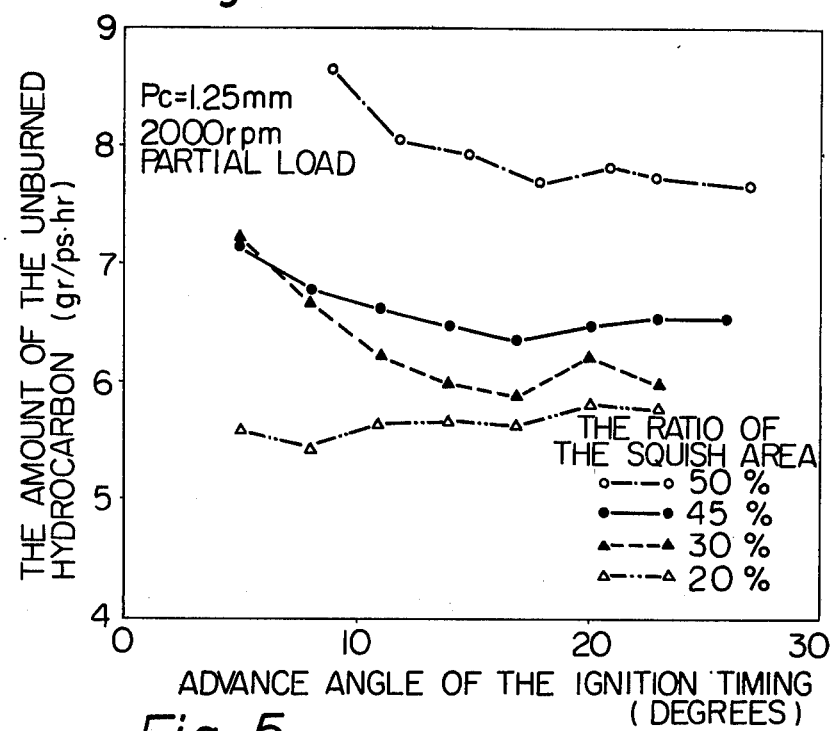
FIGS. 4 through 7 are graphs showing experimental data acquired from experiments conducted by the present inventor for determing the shape of the combustion chambers of FIG. 1.

Referring to FIGS. 1 through 3, a combustion chamber of an internal combustion engine, according to a preferred embodiment of the present invention, is defined between an inner peripheral wall 13 of a cylinder head 11 and a top end 33 of a piston 31. As will be understood from FIGS. 1 and 3, the cylinder head 11 has a cross-section of substantially a hemisphere. The spherically shaped inner wall 13 is formed with a port 21 in which an ignition plug 23 is located, an intake port 17 and an exhaust port 19. In the intake port 17 and the exhaust port 19, there are provided an intake valve 25 and exhaust valve 27, respectively, for opening and closing the respective ports according to the known timing of the operation of an internal combustion engine. On the underside of the combustion chamber, a cylinder bore 15b is formed in a cylinder block 15 having a liner surface 15a along which the piston 31 carries out a reciprocating motion in the same manner as in a conventional reciprocal piston type internal combustion engine. A gasket 29 is intervened between the cylinder head 11 and the cylinder block 15 for sealing both the combustion chamber and the cylinder bore 15b. In FIGS. 1 and 3, there is shown a state where the piston 31 comes to its top dead center position by carrying out the compression stroke. The top end 33 of the piston 31 is formed so as to have a particular shape. That is to say, the top end 33 has such a particular shape that the piston 31 cooperates with the above-mentioned cylinder head 11, having a spherical inner wall 13, so that a squish and swirl of an air-fuel mixture are created toward the end of the compression stroke of the piston 31. The particular shape of the top end 33 of the piston 31 is clearly shown in FIG. 2.

The piston 31 of the embodiment of FIG. 2 has a cylindrical outline, and the top end 33 of the piston 31 is formed with two separate raised portions 35 built on a flat bottom surface 43. These two raised portions 35 are located at two peripheral portions of the top end 33, respectively, and are circumferentially spaced apart from one another by an angle of 180 degrees. That is to say, the two raised portions 35 are disposed, respectively, at two regions of the top end which are symmetrical with respect to the central axis of the piston 31. Each of the two raised portions 35 is provided with a spherical outermost surface 37, and an opposite inner surface 39 formed as an inclined plane. The inner surface 39 may be formed as a convex or concave surface. Each raised portion 35 is also provided, at one side end thereof, with a concave surface 41 having a slope of a relatively small gradient. The concave surface 41 is smoothly connected to the flat bottom surface 43. It should be noted that the respective concave surfaces 41 of the two raised portions 35 are in symmetrical positions with respect to the central axis of the piston 31. Therefore, the concave surfaces 41 are spaced apart from one another by an angle of 180 degrees. It should further be noted that the outermost spherical surfaces 37 of the two raised portions 35 are formed as a part of the same spherical surface, respectively, which is concentric with the spherical inner wall 13 of the cylinder head 11. This fact will be clearly understood from FIG. 1. The piston 31 is formed with grooves for receiving therein piston rings 47 (FIGS. 1 and 3), and a well known structure in which the piston 31 is connected to a connecting rod by means of a connecting pin.

When the piston 31 having the above-mentioned raised portions 35 reaches close its top dead center at the end of the compression stroke while the piston is performing reciprocating motion within the engine cylinder, small gaps Pc are formed between the spherical outermost surfaces 37 and the spherical inner wall 13 of the cylinder head 11, as shown in FIG. 1. The small gaps Pc are equidistantly formed by all surfaces Sa of the outermost surfaces 37 and the inner wall 13.

With the combustion chamber formed by the above-mentioned cylinder head 11 and the piston 31, an air-fuel mixture is introduced into the engine cylinder due to the opening of the intake valve 25. Subsequently, as soon as the intake valve 25 is closed, the piston 31 starts the compression stroke. Thus, when the piston 31 reaches its top dead center, a part of the air-fuel mixture is squished by the spherical outermost surfaces 37 of the raised portions 35 of the piston 31 and the complementary inner wall 13 of the cylinder head 11. The squished air-fuel mixture is pushed out of the gaps Pc, and formed into streams as shown by arrows P1 and P2 in FIGS. 1 and 2. The streams designated by P1 are directed toward the top of the inner wall 13, and operate so as to forcedly move a layer of a cold air-fuel mixture, which extends on the surface of the inner wall 13, toward a central recess 45 of the top end 33 of the piston 31. The streams P2 of the squished air-fuel mixture, which are pushed out of the gaps Pc in the circumferential direction of the raised portions 35, through openings formed by the concave surfaces 41 of the piston 31 and the inner wall 13 of the cylinder head 11, also operate so as to forcedly move the layer of a cold air-fuel mixture toward the center of the combustion chamber. It should, however, be noted, that the streams P2 of the squished air-fuel mixture further operate so as to create a swirl S of an air-fuel mixture in the combustion chamber about the central axis of the piston 31. The swirl S in turn creates a turbulence of an air-fuel mixture in the combustion chamber, and also operates so as to move any cold air-fuel mixture which is stagnating on the surface of the top end 33 of the piston 31 or in corners of the combustion chamber. As a result, when an ignition plug 23 is operated, the air-fuel mixture within the combustion chamber can accomplish a complete combustion during a short period of time due to high-speed flame propagation. Consequently, not only enhancement of the engine output but also reduction of unburned hydrocarbons contained in the emission from the engine are achieved. Further, since the air-fuel mixture sucked into the engine cylinders is always completely burned during each combustion stroke of the pistons 31, so that the engine output can be enhanced to the maximum possible, a savings in fuel consumption is achieved.

In the embodiment of FIGS. 1 through 3, the piston 31 is formed, at the top end 33 thereof, with two raised portions 35. Alternately, three or more raised portions 35 may be formed, on the top end 33 of each piston 31, in such a manner that they are equidistantly arranged at the round periphery of the top end 33. Further, in the above-mentioned embodiment, there is shown a case where the inner wall 13 of the cylinder head 11 and the raised portions 35 of the pistons 31 have true spherical surfaces, respectively. However, the same operation and effect will be obtained even if the shapes of the inner wall 33 and the raised portions 35 slightly deviate from a true spherical surface. Also, in the above-mentioned embodiment, there is shown a case where the cylinder head 11 has a concave spherical inner wall 13 and the top end 31 has complimentary raised portions 35 of convex spherical surfaces. However, alternately, the cylinder head 11 may be formed with two or more raised portions and the top end 33 of the piston 31 may have a concave surface, so that a squish and swirl of an air-fuel mixture are appropriately created in the combustion chamber.

A description of the experiments conducted by the present inventor with respect to the above-mentioned embodiment of FIGS. 1 through 3 will now be provided with reference to FIGS. 4 through 7. The experiments were carried out so that the dimensional values of the gaps Pc creating the squish of an air-fuel mixture and of the overall surface areas Sa of the raised portions could be selected to be optimum for simultaneously accomplishing the enhancement of engine output and the reduction of unburned hydrocarbon components emitted from an internal combustion engine.

Figure 5:
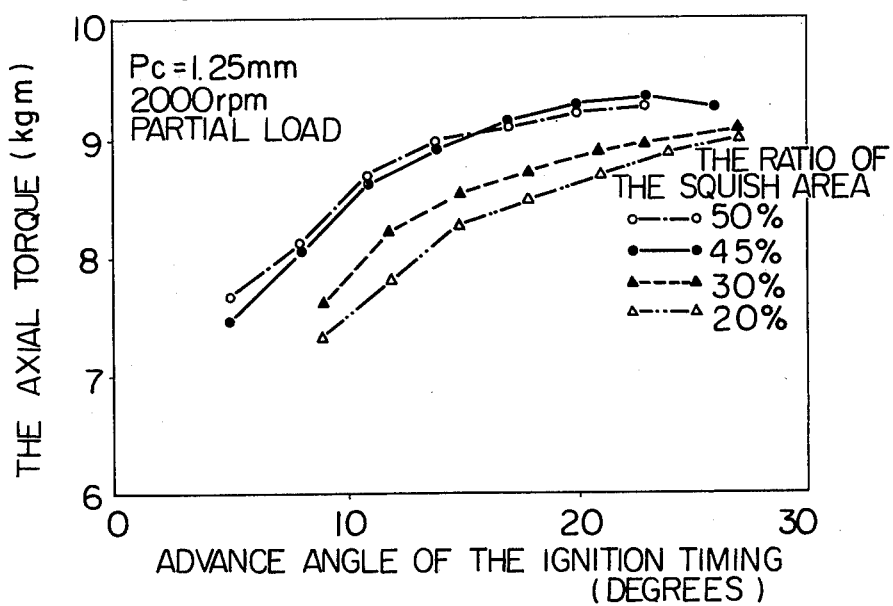

FIGS. 4 through 7 indicate measured data of the axial torque of an engine and of the amount of the unburned hydrocarbon component in the emission of the engine in the case where the dimensional values of the above-mentioned gaps Pc and of the surface areas Sa were variously changed. For example, FIGS. 4 and 5 indicate the changes in the amount of unburned hydrocarbon components and in the axial torque, respectively, in the case where the dimension of the gaps Pc was selected to be 1.25 millimeter and the ratio of the overall surface area of the spherical outermost surfaces 37 (referred to as a squish area, hereinafter) of the raised portions 35 to the entire surface area of the spherical inner wall 13 of the cylinder head 11 was changed. That is to say, the ordinate of FIG. 4 indicates the amount of unburned hydrocarbon components contained in the emission gas which is emitted from an engine during a unit time period with respect to a unit engine output. The ordinate of FIG. 5 indicates the amount of the axial torque of the engine. The abscissas of FIGS. 4 and 5 indicate the change in the advance angle of ignition timing, respectively, for convenience sake. That is to say, since the axial torque and the amount of unburned hydrocarbon components emitted from an engine are varied in response to the change in the advance angle of the ignition timing, it will be understood that in practical use of an internal combustion engine, the ignition timing must also be appropriately selected. Further, in the experiments conducted, the air-fuel ratio of an air-fuel mixture was selected to be slightly richer than the stoichiometric air-fuel ratio, the engine speed was set to 2000 r.p.m and the measurement was performed in the partial load range of the engine. From the indications of FIGS. 4 and 5, it will be understood that an increase of the squish area causes an increase of the axial torque, as well as an increase in the amount of unburned hydrocarbons emitted from an engine. However, when the ratio of the squish area was increased from 30 percent to 45 percent, the axial torque was remarkably increased; while, when the ratio of the squish area was increased from 45 percent to 50 percent, no remarkable increase of the axial torque was acquired (FIG. 5). On the other hand, the increase of the amount of unburned hydrocarbon components was gradual when the ratio of the squish area was increased from 20 percent to 45 percent. However, when the ratio of the squish area was increased from 45 percent to 50 percent, the amount of unburned hydrocarbon components emitted from the engine was very large. Therefore, from the experimental data of FIGS. 4 and 5, it was understood that selecting a ratio of the squish area of 45 percent is best, since the increase of the axial torque is remarkable, and since the increase in the amount of unburned hydrocarbon components emitted from an engine is kept at a low level.

Figure 6:
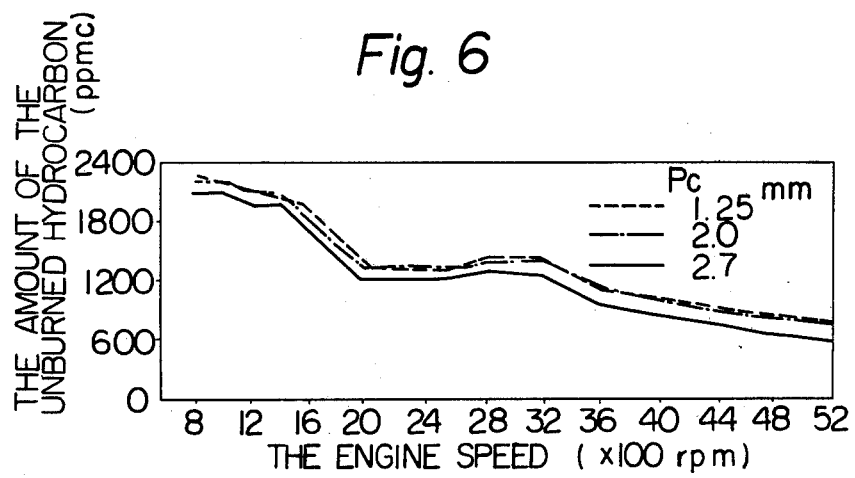
Figure 7:
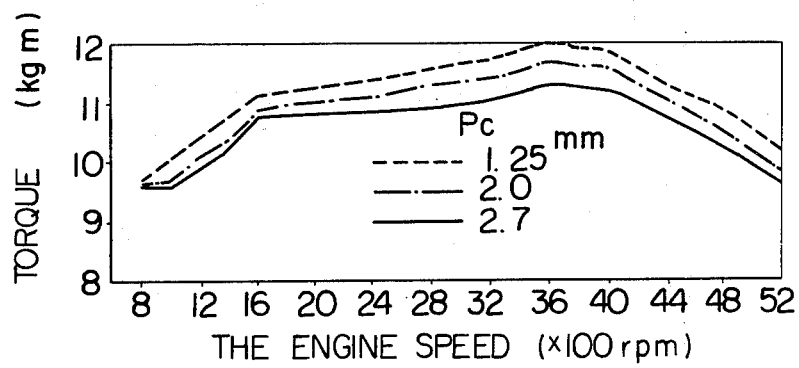

FIGS. 6 and 7 indicate changes in the amount of the unburned hydrocarbon component emitted from an engine and in the axial torque with respect to change in the rotating speed of an engine, respectively, under a condition where the ratio of the squish area to the overall surface area of the inner wall 13 of the cylinder head 11 was fixed at 45 percent and the dimension of the gaps Pc creating the squish of an air-fuel mixture was variously changed. From FIG. 6, it was understood that if the gaps Pc were set smaller, the amount of the unburned hydrocarbons from an engine became large. However, when the gaps Pc were changed from 1.25 millimeter to 2.0 millimeter, there was no remarkable increase in the amount of unburned hydrocarbon components from an engine. That is to say, if the dimension of the gaps Pc was set to a value below a specified value (not shown in FIG. 6) of the so-called quench layer, there was no occurrence of an increase in the amount of unburned hydrocarbon components emitted from an engine. Therefore, it was understood that, for the purpose of reducing the amount of unburned hydrocarbon components emitted from an internal combustion engine, the dimension of the gaps Pc creating a squish of an air-fuel mixture should be fixed at a value between 1.25 and 1.5 millimeters when the manufacturing and assemblying of a combustion chamber, and mass producibility of the combustion chamber, are taken into consideration. Also, from FIG. 7, it was clearly understood that if the gaps Pc are set smaller, an increase of the axial torque of an engine can be obtained.

From the above-mentioned experiments, it was understood that, in a combustion chamber of an internal combustion engine according to the present invention, the gaps Pc, which create a squish of an air-fuel mixture, should be fixed at a value between 1.25 and 1.5 millimeters, and the ratio of the squish area to the overall surface area of the inner wall of the cylinder head should be selected to between 35 percent and 45 percent, so that enhancement of the engine output as well as reduction of the emission of unburned hydrocarbons from the engine are acquired.

What is claimed is:

1. An internal combustion engine with a combustion chamber, said engine comprising:
   a cylinder;
   a cylinder head having an inner wall defining the upper boundary of the combustion chamber;
   a reciprocable piston in said cylinder, said piston having a circular top end and at least two raised circumferentially spaced portions thereon, each of said portions comprising:
   a first radially outermost substantially part-spherical surface spaced a small distance from the inner wall when the piston is in the top dead center position to create a squish of an air-fuel mixture,
   a radially innermost surface opposite said outermost surface, and
   a concave surface at one circumferential end of each portion extending between the innermost and the outermost surfaces from the top to the bottom thereof, said concave surface extending at the lower end thereof at a relatively small gradient to the top end of the piston to produce mixture swirl flows in a direction perpendicular to the axis of the piston as it approaches its top dead center position.

2. An internal combustion engine as claimed in Claim 1, wherein said inner wall of said cylinder head is formed with hemispherical concave surfaces, and wherein each of substantially part-spherical outermost surfaces is concentric with a corresponding one of said hemispherical concave surfaces of said inner wall of said cylinder head.

3. An internal combustion engine as claimed in claim 2, wherein said at least two raised portions of said piston are symmetrically disposed with respect to a central axis of said piston.

4. An internal combustion engine as claimed in claim 2, wherein the innermost surfaces of said raised portions of said piston define a recess therebetween on said top end of said piston defining said combustion chamber.

5. An internal combustion engine as claimed in claim 2, wherein the small distance is in a range of 1.25 through 1.5 millimeter, and the total surface areas of said substantially part-spherical surfaces of said at least two raised portions are selected to be in a range of 35 through 45 percent with respect to the surface area of each of said hemispherical concave surfaces of said cylinder head.

6. An internal combustion engine comprising:
   a cylinder;
   a cylinder head having a substantially hemispherical inner wall;
   a reciprocable piston in said cylinder, said piston having a circular top end and at least two raised circumferentially spaced portions thereon, each of said portions comprising:
a radially outermost substantially part-spherical surface concentric with the hemispherical inner wall of the cylinder head and spaced a small distance therefrom when the piston is in the top dead center position to create a squish of an air-fuel mixture,
a radially innermost inclined surface opposite said outermost surface, and
a concave surface at one circumferential end of each portion extending between the innermost and the outermost surfaces from the top to the bottom thereof, said concave surface extending at the lower end thereof at a relatively small gradient to the top end of the piston to produce mixture swirl flows in a direction perpendicular to the axis of the piston as it approaches its top dead center position.

* * * * *